T. DAVIS.
CONTROLLER FOR AIR PRESSURE SYSTEMS OF AUTOMOBILE STARTERS AND THE LIKE.
APPLICATION FILED MAR. 5, 1919.
1,356,811.
Patented Oct. 26, 1920.
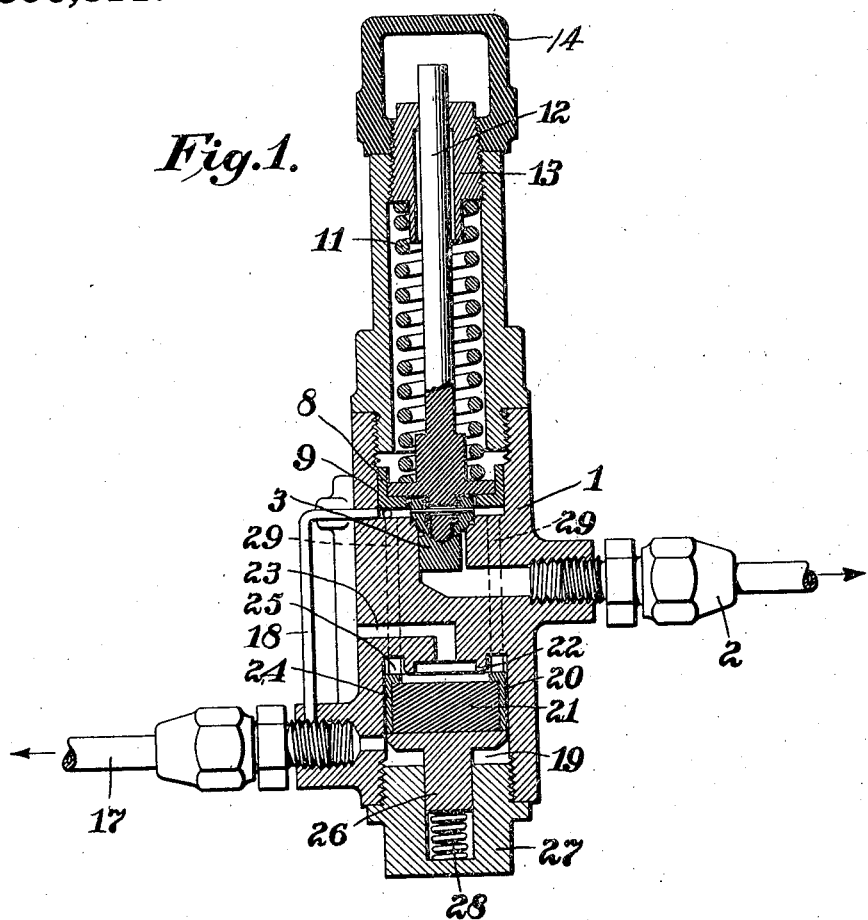
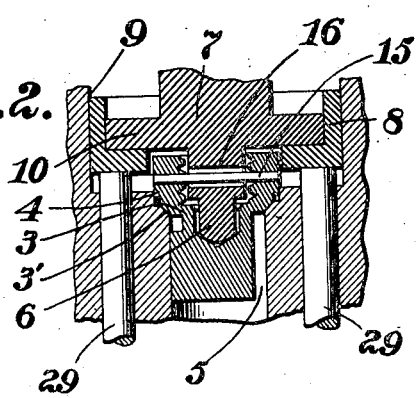
Inventor:
Thomas Davis,
by Spear, Middleton, Donaldson & Spear
Attys.

UNITED STATES PATENT OFFICE.

THOMAS DAVIS, OF DETROIT, MICHIGAN, ASSIGNOR TO THE JOHN FORD STARTER COMPANY, OF BALTIMORE, MARYLAND, A CORPORATION OF MARYLAND.

CONTROLLER FOR AIR-PRESSURE SYSTEMS OF AUTOMOBILE-STARTERS AND THE LIKE.

1,356,811. Specification of Letters Patent. Patented Oct. 26, 1920.

Application filed March 5, 1919. Serial No. 280,815.

*To all whom it may concern:*

Be it known that I, THOMAS DAVIS, a citizen of the United States, and resident of Detroit, Michigan, have invented certain new and useful Improvements in Controllers for Air-Pressure Systems of Automobile-Starters and the like, of which the following is a specification.

In Letters Patent of the United States granted to me February 11th, 1919, No. 1,294,058, I disclose an air pressure controller in an organization for starting automobiles. In said organization the controller is interposed between a supply tank and clutch mechanism which connects a rotor with or disconnects it from the engine shaft and an air compressor or pump, the clutch being controlled by a diaphragm exposed to the air delivered through the controller so that when the maximum pressure of air in the system is reached the clutch will be operated to stop the pump.

My present invention is an improvement in a controller for this general purpose or for like purposes, it being understood that I do not limit its application to an organization such as that described, which is referred to as a matter of illustration, and instead of being associated with clutch mechanism the controller may be employed in connection with systems in which a valve, belt shifter, electric switch, or other controlling mechanism may be employed.

The invention is illustrated in the accompanying drawings in which,

Figure 1 is a sectional view of the controller.

Fig. 2 is an enlarged sectional view of a valve and other members forming part of the controller.

Fig. 3 is a detail view of the valve body or stem.

In these drawings, 1 indicates a casing which is connected by a pipe 2 with the main air reservoir. The air admitted through this pipe acts on an inlet valve 3 having a conical portion 3′, to rest on a corresponding seat in the casing and a cylindrical portion 4 of larger diameter arranged in a like portion of the casing, just above the conical seat. The stem or body of this valve is of triangular cross-sectional form, as shown in Fig. 3, so that passages are left at 5 for the air to reach the head of the valve. This valve is pressed down onto its seat by a conically pointed pin 6 on a member 7, which is associated with the piston-like ring 8, movable with the member 7 within a cylindrical chamber 9. The member 7 has a flange 10 which bears on the interior of the piston member 8 and this flange is borne upon by a spring 11 surrounding the stem 12 of the member 7, this stem being guided in the collar or nut 13, which is threaded into the casing and a top cap 14 is threaded onto this nut.

The inlet valve is connected to the member 7 by a pin 15 which is mounted in the piston-like portion 4 of the valve and passes through an enlarged opening 16 in the pin 6. At 17 I show a connection leading to a diaphragm or like device which may be similar to that shown in the patent above mentioned at O and air is supplied to this connection when the inlet valve 3 opens by a conduit which for convenience of illustration I have represented as a pipe 18, though in practice this conduit will be formed within the wall of the casing and will connect with the pipe 17 by way of a lower chamber 19 in the casing. In the drawing, which is diagrammatic as far as this conduit is concerned the conduit is in the form of a pipe as stated. In either case, however, the pipe 17 will connect with the lower chamber 19, below a supplemental valve 20 having a rubber body at 21 to seat on a rib 22 and thus close the opening 23 leading to the atmosphere. This valve has a shell 24 with a flange 25 overlying the rubber body and the valve has a stem 26 guided in a nut 27 threaded into the lower end of the casing, the said stem being acted on by a spring 28. Pins indicated at 29, in Fig. 1, in dotted lines, and in full lines in Fig. 2, bear on the underside of the piston-like member 8 and on the flange 25 of the lower supplemental valve and these pins are guided in the casing. They are not fixed to either valve, but they bear thereon.

The supplemental valve is slightly less in diameter than the chamber in which it works, so that when this valve is off its seat air pressure may escape to atmosphere.

In the action of the device when the pressure being stored up in the tank by the compresser or pump reaches the maximum for which the spring 11 is set the valve 3 will lift from its conical seat slightly and the pressure will immediately act upon the enlarged area due to the piston portion 4 of the valve being of larger diameter than the conical portion, the valve responding quickly to the opening pressure as soon as the conical portion "cracks" or presents a crevice between itself and its seat and as soon as the cylindrical portion 4 gets above the cylindrical chamber of the casing in which it works the air pressure will act on the still larger area of the piston like member 8 quickly lifting this further against the spring pressure, allowing the pins 29 to rise and allowing the supplemental valve to rise against the seat rib 22, due to the action of the spring and to the pressure of air and this valve will close the port 23 leading to the atmosphere, so that the air pressure will quickly rise in the pipe 17 for operating the diaphragm or other part intended to be operated thereby to throw out the clutch and stop the pump.

The actions above described take place quickly as soon as the valve 3 rises from its seat to the slightest extent and allows the air pressure to reach the larger area of the part 4 of the valve and the still larger area of the piston-like member 8.

The quick rise of the piston, 8, will of course compress the spring, 11, and the upward movement of these parts will relieve the pins, 29, from the pressure of the spring, 11. The lower valve, 20, will then snap freely and tightly against the seat, 22, without having to overcome any pressure from the spring, 11, which, as already pointed out, is compressed as soon as the valve, 3, and piston 8, move up. It will be understood that the valve 3 with its piston 8 is free to move upwardly in excess of or in advance of the movement of the valve 20, thus relieving the supplemental valve of any reaction from the spring.

Now when the pressure in the reservoir is reduced by reason of opening the starter valve to start the engine and thereby using the air pressure in the starting motor and reducing the pressure throughout the system the valve 3 will fall together with piston 8 under the action of spring 11 and the supplemental valve will move down from its seat, so as to open the port 23 to the atmosphere for the escape of air from the diaphragm past this loosely fitted valve, allowing the diaphragm to collapse quickly and thus permitting clutch means to be thrown in to start the engine or to operate the pump to restore the pressure, this action of starting the pump taking place either immediately as in the patent above referred to or at a later time as in an application filed of even date herewith in which when the starter valve is opened the engine will be started but the pump will be kept out of service by the air pressure passing through the starter valve and acting on its clutch means to keep it disconnected from the engine shaft. In this latter case, as soon as the starter valve is again closed the air pressure which has been holding the pump clutch open will be cut off and the diaphragm having previously collapsed, by reason of the reduction of pressure in the system, due to starting, a spring will throw in the pump clutch to be driven by the engine and the pump will compress air into the system until the controller operates again by the raising of its valve 3, causing the supplemental valve to close port 23 to atmosphere and causing the pressure to rise at the diaphragm and throw out the pump clutch to stop compressing air.

The downward movement of the supplemental valve is due to the fall of pressure, the pressure of the atmosphere above it through port 23, and also to the spring 11 acting through the piston member 8 and the pins 29, which latter push the supplemental valve down.

The maximum air pressure is dependent on the adjustment of spring 11.

The minimum pressure point is determined by the area of the face of the lower valve exposed to the atmosphere through port 23, and the length of the pins 29 is an element determining the point at which the supplemental valve will break away from its seat, the longer the pins the greater the reaction of the spring 11.

The piston head 9 is separate from the stem portion so that in case the stem is out of true the piston will not be affected, but will run true in the cylinder.

It will be observed that the supplemental valve is axially in line with the main valve and its upper and lower faces are acted on by the air, the upper surface being exposed to atmospheric pressure and the lower surface to the air pressure within the system.

The controller is quick acting both for maximum pressure and minimum pressure, for as the pressure reaches the maximum point the progressively larger areas of the piston portion 4 and the piston member 8, compared to that of the valve 3, will be brought into action and the valve will open quickly to its full extent to admit the full pressure as soon as it "cracks" at its seat. On the other hand as soon as the supplemental valve leaves its seat-rib 22, due to the pressure being lowered to the point predetermined upon, the fall of pressure will take place quickly due to the opening of the port 23 leading to the atmosphere.

As before stated I do not limit my invention to an organization like that disclosed in the patent above mentioned. For instance instead of using it in such system it may be employed in a system like that disclosed in an application executed by me of even date herewith in which the diaphragm to which the controller delivers air pressure may be used to operate a pump clutch and not operate a clutch between the air motor shaft and the engine.

What I claim is:

1. In combination in an air pressure system, having a device to throw a member into and out of operation, a controller for controlling the pressure of air to said device for operating the same comprising a casing, a spring pressed air inlet valve, and a separate supplemental air valve in a separate chamber axially in alinement with the inlet valve, the said supplemental valve controlling a port to atmosphere, the chamber of said supplemental valve being in communication with the chamber of the inlet valve to receive pressure therefrom to close the said atmospheric port and being in communication also with the conduit leading from the air inlet valve to the controlled device and having its pressure reduced by reduction of pressure in the system to uncover said atmospheric port for the quick reduction of pressure, and a pin guided in the casing and bearing at its ends on the valve, substantially as described.

2. In combination in a controlling valve, a casing, an air supply pipe leading to the casing from the system, an outlet from the casing to the system, a valve in the casing controlling the communication between said inlet and outlet, a spring for pressing the valve to its seat, a supplemental valve coaxial with the valve first mentioned, a chamber in which said valve is located, a port leading through the wall of the casing from the upper part of said chamber to the atmosphere and closed by said supplemental valve when in its uppermost position, a spring under the supplemental valve pressing it toward said port to close the same, the valve first mentioned having movement toward the supplemental valve when closing and said chamber of the supplemental valve being in connection at a point below its valve with the system beyond the outlet from the casing and a connection between the valves substantially as described.

3. In combination in a controlling valve, a casing, an air supply pipe leading to the casing from the system, an outlet from the casing to the system, a valve in the casing controlling the communication between said inlet and outlet, a spring for pressing the valve to its seat, a supplemental valve coaxial with the valve first mentioned, a chamber in which said valve is located, a port leading through the wall of the casing from the upper part of said chamber to the atmosphere and closed by said supplemental valve when in its uppermost position, a spring under the supplemental valve pressing it toward said port to close the same, the valve first mentioned having movement toward the supplemental valve when closing and said chamber of the supplemental valve being in connection at a point below its valve with the system beyond the outlet from the casing and a connection between the valves, said connection consisting of a pin arranged parallel with the axes of the valves and guided in the casing substantially as described.

In testimony whereof I affix my signature.

THOMAS DAVIS.